United States Patent [19]

Phillips

[11] Patent Number: 4,534,969

[45] Date of Patent: Aug. 13, 1985

[54] METHOD FOR IMPROVING LACTATION IN RUMINANT ANIMALS

[75] Inventor: Dorothy J. Phillips, Natick, Mass.

[73] Assignee: The Dow Chemical Company, Midland, Mich.

[21] Appl. No.: 533,824

[22] Filed: Sep. 19, 1983

[51] Int. Cl.$^3$ ............................................. A61K 35/00
[52] U.S. Cl. ................................................... 424/118
[58] Field of Search ........................................ 424/118

[56] References Cited

U.S. PATENT DOCUMENTS

| | | | |
|---|---|---|---|
| 4,239,751 | 12/1980 | Coronelli et al. | 424/118 |
| 4,307,093 | 12/1981 | De Geeter et al. | 424/249 |
| 4,336,250 | 6/1982 | Scheifinger | 424/177 |
| 4,376,790 | 3/1983 | Ames | 426/2 |
| 4,377,596 | 3/1983 | Larsen | 426/2 |
| 4,388,327 | 6/1983 | Cummins | 426/2 |

FOREIGN PATENT DOCUMENTS 2057873 4/1981 United Kingdom .

OTHER PUBLICATIONS

*Journal American Chemical Society,* 106, 4895–4902 (1984).

*Primary Examiner*—Frederick E. Waddell

[57] ABSTRACT

A method for improving lactation in lactating ruminants such as cattle or goats is disclosed. Said method utilizes the antibiotic Teichomycin A$_2$ or its physiologically acceptable salts, esters and amides. Also disclosed are animal feed compositions containing said antibiotic.

6 Claims, No Drawings

METHOD FOR IMPROVING LACTATION IN RUMINANT ANIMALS

BACKGROUND OF THE INVENTION

Various agents are known to elicit modifications in the rumen fermentation pattern of ruminant animals. Certain of these modifications are utilized to effect improvements in growth rate or feed utilization efficiency in beef producing animals. However, of interest to the dairy industry would be an agent which, when administered to a lactating ruminant, would modify rumen fermentation in such a manner as to provide the animal with more energy and protein, the limiting factors in milk production. See, Clark and Davis, *J. Dairy Sci.*, 63: 873-885 (1980) which is, as well as all other references alluded to herein, incorporated by reference.

The major sources of energy to the lactating ruminant are the ruminal volatile fatty acids (VFA's): acetic acid, propionic acid and butyric acid (alternatively referred to herein as acetate, propionate and butyrate, respectively). The VFA's are the metabolic end products of carbohydrate degradation in the rumen (carbohydrates represent an important nutrient in a typical ruminant feedstuff). It is known in the art that increasing the ruminal concentration of propionate without a depression of acetate or butyrate concentrations will lead to enhanced quality as well as quantity of milk produced inasmuch as each of these three major VFA's play a role in milk production. For example, acetate is required for milk fat synthesis. Propionate is utilized to produce glucose (which is a precursor for lactose synthesis), while butyrate is utilized for both lipogenesis and glycogenesis. See Hungate, *The Rumen and its Microbes*, Academic Press, New York, 1966. Hence, upon stimulation of all three VFA's, an increase in milk production will be observed without a decrease in milk fat content (reduced milk fat content leads to inefficient milk production due to a decreased quality and a consequent reduction in the commercial value of the milk). The digestive physiology of lactating ruminants is briefly reviewed in U.S. Pat. Nos. 4,376,790 and 4,336,250.

Protein concentration is also known to be a limiting factor in milk production. For instance, increased degradation of feed protein provides more ammonia and peptides for microbial growth. Stimulated microbial growth in the rumen provides greater amounts of amino acids for the animal. It has been reported that increased amino acid supply to the small intestine leads to increases in both the yield of milk as well as milk protein concentrations. Oldham and Parker, *Process Biochemistry*, page 30 et seq, Dec./Jan. 1980/81.

SUMMARY OF THE INVENTION

The invention disclosed herein is directed to a method for improving lactation in lactating ruminant animals by administering to said animals an effective amount of the antibiotic Teichomycin $A_2$ or its physiologically acceptable salts, esters and amides. Under the nomenclature established in the World Health Organization Handbook for International Non-Proprietary Names (INN), the name "Teichomycin $A_2$" has been changed to "Teicoplanin" as the most recent name for this antibiotic factor. For simplicity of discussion the antibiotic of the present invention will be hereinafter referred to as "Teichomycin $A_2$". Also taught are various animal feed compositions containing Teichomycin $A_2$ or its physiologically acceptable salts, esters and amides.

DETAILED DESCRIPTION OF THE INVENTION

The lactation improvement method and feed compositions of the present invention involve the use of the antibiotic Teichomycin $A_2$ or its physiologically acceptable salts, esters and amides. As used herein, the phrase "Teichomycin $A_2$ or its physiologically acceptable salts, esters and amides" means at least one member selected from the group consisting of the antibiotic Teichomycin $A_2$, its physiologically acceptable salts, its physiologically acceptable esters and its physiologically acceptable amides. Thus, in the method and compositions described herein, Teichomycin $A_2$ or a physiologically acceptable salt, ester or amide thereof can be utilized individually or various combinations of Teichomycin $A_2$, its physiologically acceptable salts, esters or amides may be used. The antibiotic Teichomycin $A_2$ is disclosed and claimed in U.S. Pat. No. 4,239,751 issued to Coronelli et al., Dec. 16, 1980 and is incorporated herein by reference. The physiologically acceptable salts, physiologically acceptable esters and physiologically acceptable amides of Teichomycin $A_2$ are readily prepared employing procedures well known in the art. Representative examples of the physiologically acceptable salts, esters and amides of Teichomycin $A_2$ are described below.

Teichomycin $A_2$ contains free carboxyl groups and thus exhibits the common property of an organic acid in that it forms salts. Representative of the inorganic bases forming physiologically acceptable cationic salts with Teichomycin $A_2$ are, for example, the alkali metal hydroxides such as lithium hydroxide, sodium hydroxide and potassium hydroxide; the alkali metal carbonates and bicarbonates such as lithium carbonate and sodium bicarbonate; the alkaline earth metal hydroxides and carbonates such as calcium hydroxide and magnesium carbonate; and like inorganic bases.

Illustrative of the organic bases forming physiologically acceptable salts with Teichomycin $A_2$ are the primary, secondary and tertiary $C_1$—$C_4$ lower alkyl and lower hydroxyalkyl amines such as ethylamine, isopropylamine, diethylamine, methyl-n-butylamine, ethanolamine, and diethanolamine.

The ammonium salts of Teichomycin $A_2$ are prepared with ammonia or various ammonium hydroxides.

Physiologically acceptable esters can readily be prepared by esterification of the carboxyl groups of Teichomycin $A_2$ to give esters such as alkyl esters, cycloalkyl esters and aryl esters. Typical alkyl esters are, for example, methyl, ethyl, isopropyl or butyl esters. Typical cycloalkyl esters are cyclopropyl and cyclohexyl esters. Typical of the aryl esters are those such as the phenyl ester.

Esters can also be made by acylation of one or more of the derivatives of Teichomycin $A_2$ described herein having hydroxyl groups. For example, esters are made by acylation using groups such as formyl, acetyl, cyclohexylacetyl, and benzoyl. Esters such as phosphate esters, can also be prepared from the hydroxyl groups of Teichomycin $A_2$.

Physiologically acceptable amide derivatives of Teichomycin $A_2$ can be prepared by employing amines such as ethyl glycine, ethyl amine, diethylamine, n- methyl piperazine, or by employing acids such as acetic or succinic acid.

As used herein, the term "physiologically acceptable" when used in conjunction with salts, esters or amides refers to those salts, esters or amides of Teichomycin $A_2$ which will not cause significant adverse physiological effects when administered to an animal at dosages consistent with the method of the present invention. In the method and compositions described herein, Teichomycin $A_2$ or its physiologically acceptable salts, esters and amides are employed.

As used herein, the term "improving lactation" refers to any observed advantageous influence on ruminant milk production as a result of the administration of Teichomycin $A_2$ or its physiologically acceptable salts, esters and amides. Such improvements include, for example, increases in milk volume production without substantial concomitant decreases in fat and/or protein content, increased fat-corrected milk production, increases in butterfat or protein content as well as improved efficiency of feed utilization resulting in increased milk yield per unit of feed consumed.

In practicing the method of the present invention, an effective amount of Teichomycin $A_2$ or its physiologically acceptable salts, esters and amides is administered (preferably orally) to a lactating ruminant. As used herein, the term "effective amount" refers to that amount of Teichomycin $A_2$ or its physiologically acceptable salts, esters and amides needed to manifest an improvement in lactation in lactating ruminants. For purposes of this invention, the amount of Teichomycin $A_2$ or its physiologically acceptable salts, esters and amides to be administered may range from about 0.004 milligram (mg) per kilogram (kg) of ruminant animal body weight per day to about 2 mg per kg of ruminant animal body weight per day, preferably from about 0.01 mg per kg of ruminant animal body weight per day to about 1 mg per kg of ruminant animal body weight per day. A particularly preferred dosage range to be administered to a lactating ruminant is from about 0.05 mg per kg of ruminant animal body weight per day to about 0.5 mg per kg of ruminant animal body weight per day. The exact amount of Teichomycin $A_2$ or its physiologically acceptable salts, esters and amides to be employed will vary depending upon factors such as the species of animal, or the size, weight, age and health of the animal. In particular cases, the concentration to be administered may be determined by conventional dose titration techniques.

Teichomycin $A_2$, or its physiologically acceptable salts, esters and amides may be incorporated into a standard animal feed at a concentration of from about 0.1 to about 60 parts per million (ppm) by weight of the ultimate composition. Preferably the Teichomycin $A_2$ or its physiologically acceptable salts, esters and amides may be incorporated into a standard animal feed at a concentration of from about 0.3 to about 30 ppm by weight of the ultimate composition, and particularly preferred in the range of from about 1.5 to about 15 ppm by weight of the ultimate composition. Alternatively, it may be added to drinking water or administered in the form of boluses, liquid feed compositions or incorporated into salt blocks. It may also be administered as an emulsion, suspension, tablet, capsule or any other appropriate veterinary dosage form in either single dose increments or in sustained release form. The incorporation of antibiotics into suitable dosage forms is well known in the pharmaceutical sciences. The method of this invention includes the incorporation of Teichomycin $A_2$ or its physiologically acceptable salts, esters, and amides into suitable dosage forms together with any additional diluents, adjuvants, excipients, fillers, stabilizers, disintegrators, matrixes, polymers, emulsifying and suspending agents or any other pharmaceutical vehicle or ingredients necessary to a finished dosage form. Incorporation of Teichomycin $A_2$ or its physiologically acceptable salts, esters and amides into a standard animal feed for oral ingestion is the preferred mode of administration.

For commercial use it is convenient to provide a feed additive premix, supplement or concentrate containing Teichomycin $A_2$ or its physiologically acceptable salts, esters and amides in a proportion such that a predetermined quantity of the premix, supplement or concentrate may be added to a quantity of standard animal feed. The feed additive premix, supplement or concentrate comprises Teichomycin $A_2$ or its physiologically acceptable salts, esters and amides along with physiologically acceptable adjuvents and carriers such as, for example, soybean meal, ground corn, ground corn cobs, corn oil, barley, wheat or other edible feed grade material, mineral or vitamin mixtures, or an innocuous diluent such as an alcohol, a glycol or molasses among others. For these purposes, the premix, supplement or concentrate may contain from about 0.05 to about 80 percent by weight and preferably of from about 0.1 to about 30 percent by weight of Teichomycin $A_2$ or its physiologically acceptable salts, esters and amides in admixture with suitable adjuvant such as previously described. Crampton, et al. (*Applied Animal Nutrition,* 1969) and Church (*Livestock Feeds and Feeding,* 1977) further describe the process of admixing compounds such as Teichomycin $A_2$ into feed compositions, premixes, supplements or concentrates.

The method of the present invention further contemplates administering one of the novel compositions containing Teichomycin $A_2$ or its physiologically acceptable salts, esters and amides in combination with one or more additives such as coccidiostats, antibiotics, minerals, vitamins or any other physiologically benefical agents employed in animal husbandry.

The following test utilizing rumen fluid from fistulated cows demonstrates the ability of Teichomycin $A_2$ to elevate VFA concentrations in the rumen independent of the diet of the animals.

Two rumen-fistulated Holstein cows were tested over a period of five months which included pretreatment, treatment, and post-treatment periods. One of the cows was placed on a high grain, restricted roughage diet (hereinafter referred to as the hay-grain diet) and fed 7.2 kg per day of a mixture containing 1.8 kg of alfalfa hay and 5.4 kg of the composition shown below:

|  | (kg/100 kg of Total Composition) |
| --- | --- |
| Shelled corn, 86% dry matter | 71.553 |
| Corn gluten meal, 60% protein, 90% dry matter | 2.915 |
| Beet pulp, 90% dry matter | 21.381 |
| Dicalcium phosphate | 1.000 |
| Potassium sulfate | 0.673 |
| Calcium sulfate | 0.245 |
| Trace Mineral Salt[1] | 1.0 |
| Magnesium oxide | 0.096 |
| Vitamin premix[2] | + |
| Urea | 1.137 |

|  | (kg/100 kg of Total Composition) |
|---|---|
|  | 100.000 |
| percent dry matter | 87.47 |

[1] Commercially available Trace Mineral Salt for dairy cows was used.
[2] Commercially available premix was used to furnish 5511 International Units (IU) vitamin A and 2756 IU vitamin $D_3$ per kg dry matter of ration.

The other cow was placed on an all-roughage diet of alfalfa hay and trace mineral salt (hereinafter referred to as hay diet) and also fed 7.2 kg per day. Each diet contained at least 12 percent protein. The Teichomycin $A_2$ was added to the diets of each animal as a feed premix in a quantity representing the test concentration for a given treatment period. The Teichomycin $A_2$ was added to 0.45 kg of ground corn (hay-grain diet) or 0.45 kg of ground alfalfa hay (hay diet) at the concentraton being tested in a particular treatment period and fed to the animals on a daily basis.

During the pre-treatment period, baseline analyses of the parameters to be measured during the investigation were made. The treatment periods consisted of three separate increments each 4 weeks long. During each increment a different concentration of the antibiotic was administered. During the first treatment period the antibiotic was administered to the cows at the rate of 5 mg per animal per day. In the second period, the rate was increased to 25 mg per animal per day, and finally to 100 mg of Teichomycin $A_2$ per animal per day in the third treatment period. Rumen fluid and blood samples were taken for analysis on days 7, 14, 21, and 28 of each treatment period. On each of the indicated days, the rumen fluid samples were taken just prior to feeding, at 30 minutes, 1 hour, and then at each hour with the last sample taken 8 hours after feeding. The blood samples were taken just prior to feeding and at 2 hour intervals, with the last sample taken 8 hours after feeding.

The blood samples were analyzed for blood urea nitrogen, glucose and ammonia. The rumen fluid samples were analyzed for volatile fatty acid concentrations. Protein degradation and amino acid deamination were monitored by measuring the levels of isoacids, (for example, iso-butyric, iso-valeric and valeric acids), alpha-amino nitrogen, and ammonia nitrogen. Microbial protein levels were also measured.

The data tabulated in Table 1 clearly show the beneficial effects of the method of the present invention on in vivo rumen fermentation. The data represent the means for each treatment period for both animals pooled across rations. The data were pooled for analysis since the only statistically significant interaction of ration type and concentration of Teichomycin $A_2$ administered was observed for bacterial protein levels (as determined from the raw data for each animal).

The values shown in Table 1 are expressed as a percent of the pre-treatment (control) values. Thus, a number greater than 100 indicates an increase in the indicated parameter as compared to the pre-treatment value, and a number smaller than 100 indicates a decrease in the indicated parameter as compared to the pre-treatment value.

TABLE 1

| (Results Expressed as Percent of the Pre-treatment Value[1]) | | | | | | | | | |
|---|---|---|---|---|---|---|---|---|---|
| | Carbohydrate Metabolism | | | | | | Nitrogen Metabolism | | |
| | Acetate | Propionate | Butyrate | Total VFA[2] | A/P[3] | Total Isoacids | Ammonia-N | Amino-N | Soluble Protein |
| 5 mg/animal/day | 114 | 119 | 121 | 116 | 95 | 108 | 136 | 179 | 97 |
| 25 mg/animal/day | 139* | 153* | 174* | 145* | 91 | 175* | 158 | 200 | 89 |
| 100 mg/animal/day | 132 | 142 | 138 | 134 | 92 | 131 | 187* | 292* | 130* |

| | Nitrogen Metabolism Insoluble Protein | | Blood (Plasma) | | |
|---|---|---|---|---|---|
| | Bacterial | Protozoal | Glucose | Urea | Ammonia |
| 5 mg/animal/day | 105 | 133 | 98 | 79 | 74* |
| 25 mg/animal/day | 85 | 119 | 100 | 97 | 84 |
| 100 mg/animal/day | 122 | 138 | 120* | 102 | 89 |

[1] The means for the daily samples were averaged for each of the four weeks in each treatment period and these weekly means were then averaged to determine the 4 week mean. The 4 week means were averaged across rations and are presented as a percent of the pre-treatment value.
[2] Total VFA = Total Volatile Fatty Acid (i.e., the sum of acetate, propionate and butyrate concentrations).
[3] A/P = Mole ratio of acetate to propionate.
* = Statistically significant at the 95 percent confidence level (P < 0.05).

In general, Teichomycin $A_2$ increased the concentrations of all major volatile fatty acids and, as a consequence, of total volatile fatty acids. The magnitude of this increase was slightly greater for propionate and butyrate than for acetate, which resulted in a minor shift in the molar proportion of the acids favoring propionate and butyrate. The data in Table 1 indicate a marked effect in the overall rumen nitrogen metabolism as noted by increased concentrations of isoacids, ammonia-nitrogen and amino-nitrogen as well as soluble protein. Statistically significant differences from the pre-treatment values were observed at the 100 mg per animal per day level for ammonia-nitrogen, amino-nitrogen and soluble protein. In general, increased microbial protein levels were also observed indicating a stimulation of microbial growth.

Plasma glucose levels were affected by both ration and concentration of Teichomycin $A_2$ administered. Plasma glucose was significantly lower (P<0.05) for the animal on the hay diet than for the animal on the hay-grain diet. However, changes in glucose concentrations due to Teichomycin $A_2$ levels showed basically the same trend for both rations, therefore, the data were again pooled across rations. The pooled data demonstrated a 20 percent increase in plasma glucose at the 100 mg per animal per day level. The data in Table 1 relating to plasma metabolites (urea and ammonia) also suggest that in addition to changes in the rumen, Teichomycin $A_2$ may also increase nitrogen utilization efficiency in the animal.

Teichomycin $A_2$ may be incorporated into standard animal feeds at the concentrations taught herein as shown in the fistulated animal study described above. Other typical feed compositions to which Teichomycin $A_2$ or its physiologically acceptable salts, esters and amides are added are the following:

Feed Composition 1

| Ingredient | Percent by Weight |
|---|---|
| Corn | 32.15 |
| Barley | 10.0 |
| Molasses | 8.5 |
| Oats | 10.0 |
| Soybean Oil Meal (48% protein) | 13.8 |
| Beet Pulp | 2.5 |
| Corn Gluten Feed | 12.5 |
| Distillers Grain | 7.5 |
| Trace Mineral Mix | 0.05 |
| Salt | 1.0 |
| Dicalcium Phosphate | 2.0 |
| | 100.00 |

Feed Composition 2

| Ingredient | Percent by Weight |
|---|---|
| Dehydrated Alfalfa Meal | 25.0 |
| Cottonseed Hulls | 5.0 |
| Steamrolled Corn | 60.0 |
| Soybean meal (44%) | 3.0 |
| Calcium Carbonate | 1.0 |
| Sodium Tripolyphosphate | 0.5 |
| Cane Molasses | 5.0 |
| Trace Mineral Salts | 0.5 |
| | 100.00 |

Feed Composition 3

| Ingredient | As Fed Basis % |
|---|---|
| Corn Silage (30% Dry Matter) | 69.5 |
| Alfalfa Hay (24% Modified Crude Fiber) | 30.5 |
| Total roughage | 100.0 |
| Hominy feed (5% fat) | 37.5 |
| Beet Pulp (dried) | 25.6 |
| Wheat mill run | 25.0 |
| Molasses, cane | 10.0 |
| Urea (45% N) | 1.0 |

-continued

Feed Composition 3

| Ingredient | As Fed Basis % |
|---|---|
| Dicalcium phosphate | 0.9 |
| Total concentrate | 100.0 |

Other typical feed compositions to which Teichomycin $A_2$ or its physiologically acceptable salts, esters and amides is added can be found in the following publications: W. J. Miller, *Dairy Cattle Feeding and Nutrition*, Academic Press, 1979; and Bath et al. *Dairy Cattle: Principles, Practices, Problems, Profits*, 2nd Edition, Lea & Febiger, 1978.

What is claimed is:

1. A method for improving lactation in lactating ruminant animals which comprises administering to said animals an effective amount of Teichomycin $A_2$ or its physiologically acceptable salts, esters and amides.

2. The method of claim 1 wherein the amount of Teichomycin $A_2$ or its physiologically acceptable salts, esters and amides to be administered is from about 0.004 mg per kg of ruminant animal body weight per day to about 2 mg per kg of ruminant animal body weight per day.

3. The method of claim 2 wherein the amount of Teichomycin $A_2$ or its physiologically acceptable salts, esters and amides to be administered is from about 0.01 mg per kg of ruminant animal body weight per day to about 1 mg per kg of ruminant animal body weight per day.

4. The method of claim 3 wherein the amount of Teichomycin $A_2$ or its physiologically acceptable salts, esters and amides to be administered is from about 0.05 mg per kg of ruminant animal body weight per day to about 0.5 mg per kg of ruminant animal body weight per day.

5. A method for improving lactation in lactating ruminant animals which comprises administering to said animals from about 0.05 mg per kg of ruminant animal body weight per day to about 0.5 mg per kg of ruminant animal body weight per day of Teichomycin $A_2$.

6. The method of claim 5 wherein said ruminant animals are cattle or goats.

* * * * *